United States Patent [19]

Radici et al.

[11] 4,160,789
[45] Jul. 10, 1979

[54] BLOCK COPOLYMERS

[75] Inventors: Pierino Radici, Turate; Gaudenzio Bianchi, Fagnano Olona; Paolo Colombo, Saronno, all of Italy

[73] Assignee: Societa' Italiana Resine S.I.R. S.p.A., Milan, Italy

[21] Appl. No.: 734,932

[22] Filed: Oct. 22, 1976

[30] Foreign Application Priority Data

Oct. 30, 1975 [IT] Italy .............................. 28810 A/75

[51] Int. Cl.² .......................................... C48G 2/38
[52] U.S. Cl. .............................. 525/411; 525/413; 525/414; 525/415
[58] Field of Search ............... 260/823, 857 F, 67 FP, 260/78.3 R

[56] References Cited

U.S. PATENT DOCUMENTS

| 2,956,990 | 10/1960 | Fettes | 260/89.5 |
| 3,637,899 | 1/1972 | Nametkin et al. | 260/827 |
| 3,979,479 | 9/1976 | Radici et al. | 260/857 F |
| 3,979,480 | 9/1976 | Radici et al. | 260/67 FP |
| 3,979,481 | 9/1976 | Radici et al. | 260/857 F |
| 4,000,215 | 12/1976 | Radici et al. | 260/857 F |
| 4,000,217 | 12/1976 | Radici et al. | 260/857 F |
| 4,003,960 | 11/1976 | Radici et al. | 260/857 F |

OTHER PUBLICATIONS

Y. Yamashita & T. Hane, J. Polym. Sci., Polym. Chem. Ed. 11, 425–434 (1973).
V. H. Ohse & H. Cherdron, Makromolekulare Chemie 97, N. 2111 (1966), 139–145.

*Primary Examiner*—Hosea E. Taylor
*Assistant Examiner*—Amelia B. Yarbrough
*Attorney, Agent, or Firm*—Sughrue, Rothwell, Mion, Zinn and Macpeak

[57] ABSTRACT

Block copolymer of the structure A-B wherein:
A is a polylactone block of recurring units:

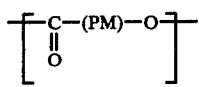

wherein PM is a linear polymethylene chain having from 2 to 13 carbon atoms,
B is a polyoxymethylene block of recurring units $+CH_2O+$. The block copolymer contains at least 2 wt.% of block B and at least 0.1 wt.% of block A.

The block copolymer can be used as modified polyacetal when rich in block B, or as special additive for plastics materials when rich in block A.

5 Claims, No Drawings

BLOCK COPOLYMERS

The present invention relates to a new block copolymer and a method for preparing the same.

One object of this invention consists in providing a new block copolymer which consist of one polylactone block and one polyoxymethylene block chemically bonded together.

Another object of this invention consists of a method for the preparation of this block copolymer.

Thus, the invention provides a block copolymer of the structure A-B wherein:

A is a polylactone block consisting of a chain of recurring units:

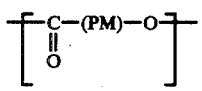

obtained from one or more lactone monomers of the formula:

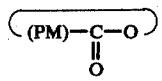

wherein PM is a linear polymethylene chain having from 2 to 13 carbon atoms, non substituted or having at least one hydrogen atom replaced by a radical selected from the group consisting of the alkyl, aryl, aralkyl, cycloalkyl and alkylenyl radicals, B is a polyoxymethylene block consisting of recurring units $+CH_2\text{-}O+$, the said block B being present in the copolymer in an amount of at least 2% by weight and the said block A being present in the copolymer in an amount of at least 0.1% by weight.

Among the lactones, those preferred for the purposes of this invention are: β-propiolactone, β-butyrolactone, δ-valerolactone, ε-caprolactone, ω-enantholactone, the methyl derivatives of ε-caprolactone in the positions alpha, gamma and delta, pivalolactone and α,α-dimethyl-β-isopropylidene-β-propiolactone.

Thus, the copolymer of the invention comprises two homogeneous blocks bonded together by a chemical covalent type bond.

The block copolymer A-B is preferably used when the block A has a molecular weight of from 1,000 up to 100,000. The minimum amount of block A in the copolymer A-B is preferably of 1.1% by weight.

The uses of the A-B copolymer depend mainly on its composition. Thus, the copolymer rich in block A is particularly useful as special additive for plastics materials, whilst that rich in block B is particularly useful as modified acetal polymer.

The block copolymer of the invention is prepared by a process which essentially comprises:

preparing the polymer A by catalytic polymerization of one or more of the aforesaid lactone monomers in a first polymerization stage;

purifying the polymer A to render it suitable for the subsequent reaction with formaldehyde;

preparing the A-B copolymer in a second polymerization stage by reacting formaldehyde monomer with the A polymer.

Moreover, according to a preferred embodiment of the process of the invention, the resulting A-B copolymer is stabilized by converting the unstable terminal hydroxyl group of the block B into a stable group.

PREPARATION OF THE POLYMER A

According to this invention the polymer A, consisting of a polylactone block, is first prepared by polymerization of the said lactone monomer or monomers in the presence of an anionic catalyst.

This anionic catalyst may be chosen from the various classes of substances which are known in the art for the purpose, such as the classes defined by the following general formulae:

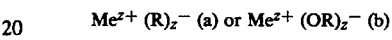

$$Me^{z+} (R)_z^- \text{ (a) or } Me^{z+} (OR)_z^- \text{ (b)}$$

wherein Me is a metal of Group IA, IIA, IIB or IIIA of the Periodic System of the Elements, z is the valency of the Element Me, and R is an alkyl, aryl, aralkyl, cycloalkyl or naphthyl group, or else hydrogen in the case of formula (a).

Amongst the above defined catalysts, those preferred are the metal-alkyl and metal-alkoxy compounds of the alkali metals and alkaline earth metals, and the metal-alkyl compounds of Group IIB metals of the Periodic System of the Elements, such as, for example, zinc- and cadmium-dibutyl.

Also useful as catalysts are the lactam derivatives of the general formula:

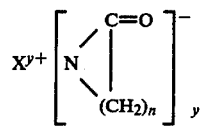

wherein X represents a metal of Group IA, IIA or IIB of the Periodic System of the Elements, or else a substituted quaternary ammonium group, n is an integer varying from 3 to 13 and y is 1 or 2.

Finally, the alkali metals such as lithium, sodium and potassium, and the magnesium alkyl derivatives (Grignard's compounds), are also useful as catalysts.

The polymerization temperature of the lactones may vary within a large range, generaly from −100° to 200° C., the best suited temperature being in each case selected according to the monomer or monomers submitted to polymerization, the monomer ratio in the case of copolymerization of several lactones, and the particular type of A polymer to be obtained.

The polymerization periods are generally from 1 minute to 120 hours.

In any case, an amount of catalyst of from 0.1 to 10 moles for each 100 moles of lactone monomer, is conveniently used.

Polymerization is preferably carried out with pure monomers, above all free from compounds with active hydrogen ions.

Finally, polymerization can be carried out in bulk, in solution or in suspension.

BULK POLYMERIZATION

In the first polymerization stage carried out in the absence of solvents or diluents (in bulk or in the molten state), the reaction conditions are adjusted in dependence on the preselected monomer, the catalyst and the intended uses. Thus, the reaction periods may generally range from 1 minute to 100 hours and usually from 5 minutes to 25 hours. It is generally possible to operate either at temperatures above or below the melting point of the A polymer being formed. However, for some monomers it is only possible to operate under more restricted conditions.

For example, in the case of ε-caprolactone it is possible to operate at 68° C. for a period of 5 minutes, using lithium-butyl as catalyst in an amount of 0.17 moles for each 100 moles of lactone. In this manner, one obtains a 97.8% conversion and a polymer A (melting point 60° C.) having a reduced viscosity of 0.68, as measured at 30° C. in a benzene solution containing 0.2 g of polymer per 100 ml of solution.

Moreover, α, α-dimethyl-β-isopropylidene-β-propiolactone is polymerized in bulk at 60° C., for a period of 15 hours, using zinc-di-n-butyl as catalyst in an amount of 0.66 moles per 100 moles of lactone. In this manner, one obtains a 90.2% conversion and a polymer A having a melting point of 195°-198° C. and a reduced viscosity of 0.23, as measured at 20° C. in a chloroform solution containing 0.5 g of polymer per 100 ml of solution.

SUSPENSION POLYMERIZATION

In suspension polymerization, the reaction conditions vary according to the preselected monomer and the diluent used.

Diluents useful for the purpose are those substances which do not dissolve the polymer A at the polymerization temperature and which are inert (non-reactive) towards the other components of the reaction medium.

Generally, diluents consists of aliphatic hydrocarbons, such as for example hexane and heptane, and cycloaliphatic hydrocarbons, such as cyclohexane.

The polymerization temperatures may range from −100° to 100° C. and operation is preferably carried out at temperatures lower than the melting point of the forming polymer, since if the product melts the use of a special type of agitator is necessary.

The polymerization times generally range from 2 minutes to 120 hours.

In any case, the selected conditions depend on the preselected monomer and other characteristics of the polymer A to be obtained.

Thus, when polymerizing at 20° C. ε-caprolactone in heptane, using ethyl-magnesium bromide as catalyst (one mole per each 100 moles of lactone), there is obtained in three hours, with a conversion of 89.4%, a polymer A having a reduced viscosity of 0.58, as measured at 30° C. in a benzene solution containing 0.2 g of polymer per 100 ml of solution.

SOLUTION POLYMERIZATION

In solution polymerization, the choice of the solvent is bound up with the particular polymer A to be produced.

The solvents normally used for the purpose are aromatic hydrocarbons, such as benzene and toluene, chlorinated aliphatic and aromatic hydrocarbons, and ethers, especially aliphatic ethers. Also useful are the aprotic polar solvents, such as substituted amides (for example, dimethylformamide and dimethylacetamide), sulfoxides (for example, dimethylsulfoxide) and substituted phosphoramides (for example hexamethylphosphoric triamide).

The temperatures and the periods of polymerization are within the ranges previously defined.

Thus, when polymerizing β-propiolactone at −65° C. in a toluene solution, using lithium-sec-butyl as catalyst (0.86 moles per 100 moles of lactone), there is obtained in a period of 40 minutes and with a conversion of 70.3%, a polymer A having a reduced viscosity of 0.37, as measured at 20° C. in a chloroform solution containing 0.5 g of polymer per 100 ml of solution. This polymer A melts at 89°-94° C.

When polymerizing δ-valerolactone at 50° C. in a benzene solution, using sodium-naphthyl as catalyst (one mole per each 100 moles of lactone), one obtains in 1 hour and with a conversion of 68.3%, a polymer A having a reduced viscosity of 0.31, as measured at 30° C. in a benzene solution containing 0.2 g of polymer per 100 ml of solution.

When polymerizing ε-caprolactone in toluene at 0° C., using lithium-butyl as catalyst (0.1 moles per 100 moles of lactone), one obtains in 10 minutes and with a conversion of 94.3%, a polymer A having a reduced viscosity of 1.21, as measured in a benzene solution containing 0.2 g of polymer per 100 ml of solution.

Preparation of polymer A, other than in solution, in suspension or in bulk, can also be carried out by using a mixed technique.

For example, the passage from one to another technique can be effected by using a mixture of solvent and diluent and varying the composition of the mixture during the polymerization reaction.

TREATMENT OF THE POLYMER A

The polymer A, prepared according to the methods described, is subjected to a treatment which renders it suitable for the subsequent reaction with formaldehyde.

The said treatment consists essentially in purifying the polymer A containing the catalytically active nucleus in the macromolecular chain.

More particularly, the polymer A is purified to remove the unreacted monomers, the free catalytic residues and any other possible impurities.

Purification may be effected by dissolving the polymer A in a solvent, followed by precipitation and washing of the precipitate. The solvents suitable for the purpose are those indicated for the solution polymerization, in which the impurities are easily dissolved and which do not destroy the catalytically active centres.

This procedure is generally used when the polymer A is prepared in bulk or in suspension.

More particularly, the polymer A is dissolved in the solvent at a temperature of from −80° to 100° C., preferably from 0° to 50° C., and precipitation is then induced by adding a non-solvent. The non-solvents especially suitable for the purpose are the aliphatic hydrocarbons, such as hexane and heptane. The polymer A is then filtered and washed by means of the solvents already described.

During the reaction with formaldehyde, the polymer A can be used in the form of a solution in a solvent or a suspension in a diluent, as a function of the preselected polymerization medium.

In the second case, the polymer A should be in an extremely divided physical form, thereby to promote contact of its active centres with formaldehyde.

For this reason, when the polymer A forms a precipitate, the precipitation conditions are advantageously so adjusted as to obtain the polymer A in the form of particles of restricted size, for example from 1 to 100 microns.

When the polymer A is obtained by the suspension techique, the lactone polymerization may advantageously be carried out in such a manner as to directly obtain the polymer in the form of particles having a size suitable for reaction with formaldehyde. In this case, it may be sufficient to filter the suspension of polymer A and thoroughly wash the solid to remove the undesired impurites.

The polymer A obtained by the solution technique is usually precipitated by adding a non-solvent. Washing of the precipitate then follows.

PREPARATION OF THE A-B COPOLYMER

According to the process of this invention, the polymer A prepared by the treatment previously described, is contacted with formaldehyde monomer in a second polymerization stage in order to form the A-B copolymer.

To this end, the polymer A in powder form, or dissolved in a solvent, or suspended in a diluent, is contacted with gaseous formaldehyde or else with a solution of formaldehyde in an organic solvent.

The solvents or diluents used for the second polymerization stage should not interfere with the active centres of polymer A and should be inert (non-reactive) towards the other components of the reaction medium.

Operation is usually carried out by suspending the polymer A in a liquid diluent in which the copolymer A-B is insoluble. This diluent is generally chosen from among aliphatic hydrocarbons, aromatic hydrocarbons, cycloaliphatic hydrocarbons and ethers. Examples of suitable diluents are heptane, benzene, toluene, cyclohexane and ethyl ether.

The reaction medium should be anhydrous. Preparation of the A-B copolymer may be carried out within a large range of temperatures, such as from $-70°$ to $100°$ C., and preferably from $-20°$ to $80°$ C.

The formaldehyde which is used should be extremely pure and anhydrous. A formaldehyde suitable for the purpose can, for example, be obtained by the purification processes described in the U.S. Pat. Nos. 3,118,747 and 3,184,900.

In the said polymerization stage, the order of addition of the reagents is not important.

In a preferred embodiment, gaseous formaldehyde is introduced into the solution or suspension of the polymer A in a continuous process. This can be achieved by feeding the formaldehyde and the polymer A continuously into a reactor, for example, according to the polymerization method described in U.S. Pat. No. 3,458,479 relating to the formation of formaldehyde homopolymers.

The amount of formaldehyde which is fed in depends upon the size of the block B to be grafted onto the polymer A, also taking into account the fact that, under the conditions described, practically total polymerization of the added formaldehyde is achieved.

In each case there is obtained a suspension of the copolymer A-B. It should be noted that analysis of the product obtained by the process of this invention does not show the presence of formaldehyde homopolymer.

The resulting copolymer A-B may be subjected to purifying treatments essentially intended to remove possible unaltered polymer A.

To this end, the solid obtained upon filtration of the suspension, is submitted to washing operations, using those substances which have been previously described as solvents for the polymer A. These treatments may be carried out at ambient temperature or at higher temperatures, such as up to $110°$ C. The polymer A-B is finally dried at temperatures lower than about $100°$ C. and at atmospheric or subatmospheric pressure.

The removal of the possible unaltered polymer A may also conveniently be carried out upon stabilization of the copolymer A-B.

STABILIZATION OF THE COPOLYMER A-B

The copolymer A-B of the present invention has a block B which carries a thermally unstable terminal hydroxyl group. It is therefore expedient to convert this terminal hydroxyl group into another more stable group, such as, for example, an ester, ether or urethane group.

To this end, the copolymer A-B may be brought into contact with a reagent such as an anhydride of carboxylic acid (generally acetic or propionic anhydride) for the esterification; or else with an ortho-ester for the etherification; or else with a substance containing isocyanate or isothiocyanate groups for transformation into urethane or thiourethane groups.

The procedure is completely similar to that known in the art for blocking the unstable terminal hydroxyl groups of the polyoxymethylenes.

In a preferred embodiment, the copolymer A-B is suspended in a liquid reaction medium comprising a substance which is a solvent for said copolymer and a substance which is non-solvent for the latter, the said solvent and non-solvent substances being wholly miscible at the reaction temperature, but immiscible or only slightly miscible at temperatures lower than the reaction temperature, e.g. at ambient temperature. A method of this type is described in the Italian Pat. No. 946,165.

It is also possible to work without solvents or diluents, by contacting the liquid or gaseous reagent with the solid copolymer A-B.

Stabilization is generally carried out within a temperature range of $60°$ C. to $200°$ C. and preferably from $120°$ to $170°$ C., for a period of from 1 to 120 minutes.

Finally, it is possible to use a catalyst of the type used in the art for stabilizing polyoxymethylenes.

THE A-B COPOLYMER

The block copolymer of this invention has the structure: A-B, where A is the polylactone block and B the polyoxymethylene block.

This structure is justified both by considerations related to the reaction mechanism, and also by analytical measurements.

It is known that, in the polymerization reaction of one or more lactone monomers in the presence of an anionic catalyst, the resulting polymer A has an ionic couple on the terminal group of the macromolecular chain.

There are numerous studies on these subjects, such as those appearing in Makromolekulare Chemie 56, 179 (1962) and 97, 139 (1966) and in Journal Polymer Sci., Polymer Chem. Ed. 11 (1973) 425.

This ionic couple originates polymerization of formaldehyde with production of the A-B copolymer.

Production of the copolymer of the present invention is made possible by the use of solvents, diluents and reagents of especial purity, or anyway of purity such as to achieve conditions typical of the growth of living polymers.

In addition to the above considerations, the composition of the A-B copolymer is confirmed by the following analytical tests:

Ultimate analysis (carbon, hydrogen and oxygen) confirmed the reaction and extraction balances.

The presence of the A and B blocks was determined by gas chromatographic pyrolytic analysis.

In the infra-red analysis of the non-stabilized A-B copolymer the presence is noted of the —CH$_2$OH vibration band at 3420 cm$^{-1}$, of the lactonic C═O band at 1740 cm$^{-1}$ and there is also noted the presence of bands at 4425 and 2020 cm$^{-1}$ related to the polyoxymethylene chain.

The presence of the A and B blocks was confirmed by nuclear magnetic resonance analysis.

The infra-red analysis of the A-B copolymer stabilized by acetylation of the terminal hydroxyl groups has shown disappearance of the band related to —CH$_2$OH and appearance of the band at 1750 cm$^{-1}$ related to the C═O of the acetyl ester.

To prove the structure of the A-B copolymer, the following test was carried out.

A copolymer A-B was prepared from ε-caprolactone and formaldehyde and this copolymer was purified by extraction with toluene. The lactone homopolymer is soluble in toluene.

Upon drying, the non-stabilized copolymer was submitted to pyrolysis at controlled temperature in a thermoscale (200°C.) and the pyrolysis residue was equal to the initial content in lactone block. This residue had a melting point of 60° C., equal to that of poly-ε-caprolactone.

The physical, mechanical, optical, electrical and applicative characteristics of the A-B copolymer of this invention depend upon its composition and molecular weight, as well as upon the particular lactone monomers selected.

Therefore, it is not possible to define a single group of properties. However, it is possible to give indicative values for a composition interval and for a particular lactone monomer.

In Table 1, there are recorded under (a) some characteristics determined on samples of A-B copolymer of ε-caprolactone and formaldehyde containing from 20% and 85% by weight of A block.

Under (b) there are given the same characteristics determined on samples of poly-ε-caprolactone.

Under (c) there are given the characteristics determined on samples of A-B copolymers of ε-caprolactone and formaldehyde containing from 80 to 99.9% of block B.

Under (d) there are given the same characteristics determined on acetylated polyformaldehyde.

Table 1

|  | (a) | (b) | (c) | (d) |
| --- | --- | --- | --- | --- |
| Tensile strength Kg/cm$^2$ (ASTM-D638) | 300–400 | 210–280 | 400–700 | 720 |
| Elongation % (ASTM-D638) | 300–150 | 500–1000 | 160–60 | 60 |
| Impact strength Izod with notch Kg.cm/cm (ASTM-D256) | — | — | 8–16 | 12 |
| Density g/ml | 1.15–1.30 | 1.149 | 1.25–1.42 | 1.42 |
| Solubility in benzene at 20°–25° C. | insoluble | soluble | insoluble | insoluble |

In the following experimental examples the parts and percentages are intended by weight unless otherwise specified.

EXAMPLE 1

Preparation of polymer A

To 114 parts of pure ε-caprolactone, maintained under agitation at 70° C. in a nitrogen atmosphere, there are added 0.011 parts of lithium n-butyl (as a 10% solution in hexane).

The polymerization is rapid and after 6 minutes 250 parts of anhydrous toluene are introduced. Upon cooling to ambient temperature 800 parts of anhydrous heptane are added. The polymer A precipitates in a very fine and dispersed form.

The suspension is filtered and thoroughly washed with heptane, operating so as to prevent any contact with moisture or air, until the aromatic solvent is completely removed.

Analysis of the polymer A shows the following results:

Conversion: 97.8%
Reduced viscosity: 0.68 (as measured at 30° C. in a benzene solution with a concentration in polymer A of 0.2 g/dl)
Melting point: 60° C.
Particle size:
>88 microns=1.4%
88–44 microns=50.2%
<44 microns=48.4%.

The suspension of the polymer A is stored at 0° C. and used as such for the subsequent reaction with formaldehyde.

PREPARATION OF THE A-B COPOLYMER

Pure gaseous formaldehyde monomer is introduced at the rate of 2.5 parts per minute into a polymerization reactor containing 1000 parts of heptane and having a vigorous stirrer. Rigorously controlled conditions in respect of the absence of humidity and of air are maintained in the reactor by means of a suitable device with a flow of nitrogen.

Before the addition of formaldehyde, 221 parts of the above-described polymer A are charged into the reactor.

The reactor is immersed in a water bath so as to maintain an inert temperature of 20°–25° C.

Formaldehyde is fed for 32 minutes and absorption and polymerization of the latter are extremely rapid, so that practically no unaltered monomer is discharged from the reactor.

Upon completion of the formaldehyde addition, agitation is still maintained for 15 minutes and the suspension is then filtered.

The A-B copolymer is dried in a vacuum oven at 50° C. and then thoroughly washed with toluene at 30°–40° C. and finally with acetone.

Analysis of the A-B copolymer shows the following results:

Overall yield: 87%

Block A%: 77.0 (ultimate analysis: carbon = 57.80%, hydrogen = 8.27%).

The A-B copolymer is subjected to pyrolysis in a thermoscale at 200° C. in an inert atmosphere. A weight loss of 23% is noted. Analysis of the residue shows that the latter consists essentially of polycaprolactone (melting point: 60° C.; ultimate analysis: carbon = 63.12%; hydrogen = 8.76%).

Intrinsic viscosity: 0.50 (as measured at 60° C. in a solution of p-chlorophenol with 2% of α-pinene with a copolymer concentration of 0.5 g/dl).

Analysis of the infra-red spectrum: The spectrum reveals the presence of the band related to the group —$CH_2OH$ at 3480 cm$^{-1}$, of the band related to the lactonic C=O group at 1740 cm$^{-1}$; there are also present bands at 4425 cm$^{-1}$ and 2020 cm$^{-1}$ related to the oxymethylene chain.

STABILIZATION OF THE A-B COPOLYMER 100 parts of A-B copolymer described above are esterified under inert conditions in a reactor fitted with a stirrer, with a mixture of 100 parts of acetic anhydride (free from acetic acid) and 250 parts of n-decane. The system is maintained under agitation for 20 minutes at 150° C., the pressure being adjusted so as to keep said system at boiling point.

The stabilized A-B copolymer is filtered, washed with acetone, then with water and then again with acetone.

It is dried in vacuum oven at 50° C. and there is noted a reaction yield equal to 96.0%.

The analytical data of the stabilized A-B copolymer do not differ appreciably from those obtained with the non-stabilized copolymer so far as the intrinsic viscosity and the block A content are concerned.

The other tests give the following results:

Analysis of the infra-red spectrum: Compared with the non-stabilized copolymer, there are noted in the spectrum the disappearance of the band relating to the —$CH_2OH$ group and the appearance at 1750 cm$^{-1}$ of the band relating to the C=O group of the acetyl radical.

Thermal degradation test: $K_{220} = 0.06$.

Weight loss percentage per minute during the first 30 minutes at 220° C. in a nitrogen atmosphere, measured by thermoscale.

The stabilized A-B copolymer is admixed with 0.3% of polylauryllactam and 0.3% of 2,2'-metylenebis (4-methyl-6-tert-butylphenol) and the blend is subjected to physical-mechanical tests (Table 2).

EXAMPLE 2

Operating according to the procedure of Example 1, a stabilized copolymer A-B is prepared with a different content in block A.

This A-B copolymer is subjected to accurate extraction with toluene at boiling point, under inert conditions, in a Soxlhet extractor, for 24 hours.

The solvent, when dried off, does not leave any residue.

The thus treated A-B copolymer is thoroughly washed with acetone and then dried at 60° C. in a vacuum oven.

The analysis shows:

Overall yield: 90.1%.

Block A%: 48.4 (ultimate analysis: carbon 51.20%; hydrogen 7.66%)

Intrinsic viscosity: 0.67 (as measured in p-chlorophenol)

Thermal degradation test: $K_{220} = 0.05\%$.

As a comparative test, 900 g of anhydrous dimethylformamide, 80 g of polycaprolactone (the latter being prepared as described in the first part of Example 1 and then dried), and 80 g of acetylated polyoxymethylene are placed in a 10 liters flask, operating under inert conditions and under agitation.

The polyoxymethylene, produced by polymerization of anhydrous formaldehyde in the presence of an anionic initiator and then esterified with acetic anhydride, has an intrinsic viscosity of 2.07, as measured in p-chlorophenol.

The mixture is heated under stirring and the polycaprolactone immediately dissolves, whereas polyformaldehyde is dissolved at a temperature higher than 130° C. A homogeneous solution is obtained at 152° C.

The latter is then cooled to ambient temperature, while simultaneously adding 4,500 g of heptane. The resulting suspension is filtered and the solid is washed with heptane and dried.

The residual solid, equal to 159.5 g, is extracted for ten hours in a Soxlhet extractor by means of boiling toluene. The solvent recovered is dried off, thus obtaining 79.6 g of residual solid. This residue melts at 60° C. and, when subjected to ultimate analysis, is shown to be polycaprolactone (carbon: 63.1%; hydrogen:8.75%).

The residue remaining undissolved after extraction with toluene is dried in a vacuum oven at 60° C. 79.4 g of product are recovered which, when subjected to ultimate analysis was shown to be polyformaldehyde (carbon: 40.0%; hydrogen: 6.66%).

EXAMPLE 3

Preparation of the polymer A

To 140 parts of α,α-dimethyl-β-isopropylidene-β-propriolactone, there are added 1.27 parts of zinc-n-butyl in paraffin solution, operating under inert conditions under a flow of nitrogen. The system is maintained at 60° C. for 15 hours.

The resulting polymer A is finely ground under inert conditions and then thoroughly washed with heptane at 30° C.

Analysis shows:

conversion: 90.2% reduced viscosity: 0.23 (as measured at 20° C. in chloroform with a polymer concentration of 0.5 g/dl)

melting point: 195° ÷ 198° C.

particle size:

>88 microns: 0.5%

88–44 microns: 30.5%

<44 microns: 69.0%

PREPARATION OF THE A-B COPOLYMER

Operating according to the procedure of the first example, a copolymer A-B is prepared from formaldehyde monomer and the above described polymer A.

This A-B copolymer has the following characteristics:
  block A%: 5.8 (ultimate analysis: carbon: 41.70%; hydrogen: 6.75%)
  intrinsic viscosity: 2.60
  The A-B copolymer is extracted for 20 hours in a Soxlhet extractor by means of boiling chloroform. The recovered solvent, when dried off, does not leave any residue.

On the contrary, a physical blend of acetylated polyoxymethylene, identical to that used in Example 2, and polymer A, prepared as described in the first part of the example and then dried, is separated into two constituents by extraction in a Soxlhet extractor by means of chloroform. The solvent, when dried off, leaves in fact a residue consisting of polymer A, whose separation is complete.

EXAMPLE 4

Preparation of polymer A

To 114 parts of pure ε-caprolactone dissolved in 200 parts of anhydrous heptane, maintained under agitation at 20° C. in an inert atmosphere, there are added 0.0064 parts of lithium-n-butyl. After a few minutes, the polymerization starts with formation of a polymer suspension.

The suspension is maintained under the specified conditions for 30 minutes. The polymer A is filtered and thoroughly washed with heptane under inert conditions, so as to completely remove the reaction liquid.

Analysis shows:
  conversion: 86.1%
  reduced viscosity: 1.0 (as measured at 320° C. in a benzene solution with a polymer concentration of 0.2 g/dl)
  melting point: 60°–61° C.
  particle size:
    >88 microns: 1.2%
    88–44 microns: 48.8%
    <44 microns: 50.0%

PREPARATION OF THE A-B COPOLYMER

Operating according to the procedure of Example 1, a copolymer A-B is prepared by polymerizing formaldehyde in the presence of the previously described polymer A, and this copolymer is then stabilized.

The stabilized copolymer A-B is accurately extracted in a Soxlhet extractor by means of boiling toluene. The solvent recovered does not leave any residue, when dried off.

The characteristics of the stabilized copolymer A-B are as follows:
  Overall conversion: 87.8%
  block A%: 23,6 (ultimate analysis: carbon: 25.4% hydrogen: 7.12%)
  Melting point: 172°÷174° C.
  intrinsic viscosity: 1.97 (as measured at 60° C. in p-chlorophenol with 2% of alpha-pinene with a copolymer concentration of 0.5 g/dl).
  thermal degradation test: $K_{220}=0.05$
  NMR analysis
  A solution of 20% of A-B copolymer in deuterated dimethyl sulphoxide is formed at 140° C. Analysis of the spectrum shows the presence of the polymeric blocks recognizable by the Chemical Shifts of the different protonic groups of the polyester and polyformaldehyde parts. Quantitative evaluation confirms the data of the ultimate analysis.

EXAMPLE 5

Preparation of the polymer A

To 72 parts of pure β-propriolactone dissolved in 200 parts of anhydrous toluene, maintained under agitation at −65° C. under inert conditions, there are added 0.64 parts of lithium-sec-butyl. After a few minutes the polymerization starts with release of heat.

Operation is carried out under the above conditions for 40 minutes and the conversion is 70.3%.

The polymer A is purified by precipitation by means of heptane, filtration and thorough washing with heptane. The polymer A is then dissolved in toluene and stored at −60° C.

Analysis shows the following results:
  reduced viscosity: 0.37 (as measured at 20° C. in a cloroform solution with a polymer concentration of 0.5 g/dl)
  Melting point: 89°÷94° C.

PREPARATION OF THE A-B COPOLYMER

A copolymer A-B is prepared from the above described polymer A and formaldehyde and this copolymer is then stabilized, operating in the same manner as in Example 1. The formaldehyde polymerization is carried out by using toluene as diluent medium, thus obtaining the copolymer in the form of a very fine powder.

The stabilized copolymer A-B is extracted by means of boiling chloroform in a Soxlhet extractor.

The characteristics of the A-B copolymer are as follows:
  Overall conversion: 92.0%
  block A%: 2.6 (ultimate analysis: carbon: 40.6%; hydrogen: 6.64%)
  Intrinsic viscosity: 2.84 (as measured in p-chlorophenol)
  Gas chromatographic pyrolysis:
  In the pyrolysis gases (about 500° C.) there are identified: β-propiolactone, trioxan and tetroxan (formed by cyclization of formaldehyde under the analysis conditions). Formaldehyde does not appear in the chromatogram, since a flame ionization detector is used. The amount of lactone recovered accords with that obtained by ultimate analysis.

EXAMPLE 6

Preparation of the polymer A

To 114 parts of ε-caprolactone dissolved in 200 parts of anhydrous toluene, maintained under agitation at about 0° C. under inert conditions, there are added 0.007 parts of lithium-n-butyl. After a while the polymerization starts and the solution becomes viscous.

The solution is kept under such conditions for 10 minutes, the conversion being of 94.3%.

The polymer A is purified by precipitation with heptane, filtration and thorough washing with heptane.

The analysis shows:
  Reduced viscosity: 0.78 (as measured in benzene)
  Melting point: 60°÷62° C.

PREPARATION OF THE A-B COPOLYMER

The polymerization of formaldehyde and the stabilization are carried out as in Example 1 and a stabilized A-B copolymer is obtained with the following characteristics:

Overall conversion: 87.4%
block A%: 15.4 (ultimate analysis: carbon: 44.60%; hydrogen: 6.95%)
intrinsic viscosity: 1.87 (as measured in p-chlorophenol).
thermal stability test: $K_{220}=0.05$ The stabilized A-B copolymer is admixed with 0.5% of polylaurillactam and 0.3% of 2,2'-methylenebis (4-methyl-6-tert-butylphenol) and the blend is then submitted to physical-mechanical tests (Table 2).

EXAMPLE 7

Operation is carried out as in Example 1, introducing the formaldehyde monomer at the rate of 2.5 parts per minute, for 73 minutes, into the reactor containing 1000 parts of heptane and 4.8 parts of the polymer A of Example 6, thus obtaining a copolymer A-B with a content in block A of 5.1% with a 98% conversion with respect to the feed in formaldehyde. The copolymer stabilized as in Example 1 has the following characteristics:

Overall yield: 89.5%
Block A%: 5.1 (ultimate analysis: carbon: 41.20%; hydrogen: 6.75%)
intrinsic viscosity: 2.07 (as measured in p-chlorophenol)
melting point: 174°÷176° C.
thermal stability test: $K_{220}=0.04$ The stabilized A-B copolymer is admixed with 0.5% of polycaprolactam and 0.3% of 2,2'-methylenebis(4-methyl-6-tert-butylphenol) and the blend is submitted to physical-mechanical tests (Table 2).

EXAMPLE 8

Operation is carried out as Example 1, introducing the formaldehyde monomer at the rate of 2.25 parts per minute, for 82 minutes, into the reactor containing 1000 parts of heptane and 2.25 parts of the polymer A of Example 6, thus obtaining a copolymer A-B with a content in block A of 1.1% with a 98% conversion with respect to the feed in formaldehyde. The copolymer stabilized as in Example 1 has the following characteristics:

Overall yield: 91.5%
Block A%: 1.1
(ultimate analysis: carbon: 40.26%; hydrogen: 6.65%)
intrinsic viscosity: 3.1 (as measured in p-chlorophenol)
melting point: 175°÷176° C.
Thermal stability test: $K_{220}=0.03$ The stabilized A-B copolymer is admixed with 0.5% of polylauryllactam and 0.3% of 2,2'-methylenebis (4-methyl-6-tert-butylphenol) and the blend is submitted to physical-mechanical tests (Table 2).

Gas chromatographic pyrolysis
In the pyrolysis gases (about 520° C.) there is identified ε-caprolactone, in addition to trioxane and tetroxane (the latter being formed by cyclization of formaldehyde under the analysis conditions).

The amount of lactone recovered accords with that obtained by ultimate analysis.

Table 2

|  | Ex. 1 | Ex. 6 | Ex. 7 | Ex. 8 |
|---|---|---|---|---|
| Tensile strength Kg/cm² (ASTM/D638) | 320 | 500 | 590 | 680 |
| Elongation % (ASTM D638) | 280 | 120 | 90 | 70 |
| Impact strength Izod with notch kg/cm² (ASTM D256) | — | — | 12.1 | 14.5 |
| Density g/ml | 1.21 | 1.37 | 1.40 | 1.41 |
| Solubility in benzene (20°–25° C.) | ins. | ins. | ins. | ins. |

We claim:

1. A block copolymer of the structure A-B wherein:
A is a polylactone block consisting of a chain of recurring units:

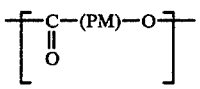

obtained from one or more lactone monomers of the formula:

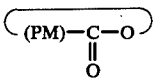

wherein PM is a linear polymethylene chain having from 2 to 13 carbon atoms, non substituted or substituted by having at least one hydrogen atom replaced by a radical selected from the group consisting of the alkyl, aryl, aralkyl, cycloalkyl and alkylenyl radicals, B is a polyoxymethylene block consisting of recurring units ${-\!\!\!-\!\!}$CH$_2$-O${-\!\!\!-\!\!}$, the said block B being present in the copolymer in an amount of at least 2% by weight and the said block A being present in the copolymer in an amount of at least 0.1% by weight.

2. The block copolymer of claim 1, wherein said block A has a molecular weight of from 1,000 to 100,000.

3. The block copolymer of claim 1, wherein said block A is present in an amount of at least 1.1% by weight.

4. The block copolymer of claim 1, wherein said lactones are selected from the group consisting of β-propiolactone, β-butyrolactone, δ-valerolactone, ε-caprolactone, ω-enantholactone, the methyl derivatives of ε-caprolactone in the alpha, gamma and delta positions, pivalolactone and α, α-dimethyl-β-isopropylidene-β-propiolactone.

5. The block copolymer of claim 1, wherein the terminal group of the linear polymethylene chain is selected from the class consisting of the ester, ether and urethane groups.

* * * * *